United States Patent
Waite et al.

(10) Patent No.: US 11,995,425 B2
(45) Date of Patent: May 28, 2024

(54) MICROSERVICE CONTAINER DEPLOYMENT SYSTEM

(71) Applicant: Toshiba Global Commerce Solutions Holdings Corporation, Tokyo (JP)

(72) Inventors: Jonathan M. Waite, Apex, NC (US); Zachary M. Darden, Apex, NC (US); Gary R. Harper, Raleigh, NC (US); Jeffrey A. Duska, Cary, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 276 days.

(21) Appl. No.: 17/511,789

(22) Filed: Oct. 27, 2021

(65) Prior Publication Data

US 2023/0127037 A1   Apr. 27, 2023

(51) Int. Cl.
  *G06F 9/44*   (2018.01)
  *G06F 8/61*   (2018.01)
  *G06F 9/455*   (2018.01)

(52) U.S. Cl.
  CPC .......... *G06F 8/63* (2013.01); *G06F 9/45558* (2013.01); *G06F 2009/45562* (2013.01)

(58) Field of Classification Search
  None
  See application file for complete search history.

(56) References Cited

U.S. PATENT DOCUMENTS

| | | | |
|---|---|---|---|
| 7,971,210 B2 | 6/2011 | Arthurs et al. | |
| 10,657,019 B1* | 5/2020 | Chopra | G06F 11/3082 |
| 2002/0174161 A1 | 11/2002 | Scheetz et al. | |
| 2020/0195528 A1* | 6/2020 | Barton | H04L 47/2425 |
| 2022/0222105 A1* | 7/2022 | Sedayao | G06F 8/63 |
| 2023/0059339 A1* | 2/2023 | Rangarajan | G06F 8/61 |
| 2023/0195435 A1* | 6/2023 | Jaeger | G06F 8/63 |
| | | | 717/143 |

* cited by examiner

*Primary Examiner* — Qamrun Nahar
(74) *Attorney, Agent, or Firm* — Patterson + Sheridan, LLP (57) ABSTRACT

Embodiments herein describe a deployment strategy where a vendor deployment system sends to each customer site the same binary that defines all the microservices offered by the vendor deployment system. That is, the vendor deployment system can build one binary image of its platform (which has all the microservices) that is deployed to every customer site. The vendor also provides a deployment descriptor that is used during runtime to activate the microservices intended for use at the customer site. In this manner, the vendor deployment system can generate a customized deployment without having to build a new binary by manipulating the data or flags in the deployment descriptor.

18 Claims, 4 Drawing Sheets

MICROSERVICE CONTAINER DEPLOYMENT SYSTEM

BACKGROUND

Containerization is the packaging of software code with the operating system (OS) libraries and dependencies required to run the code to create a single lightweight executable (i.e., a container) that can runs on any multiple different types of computing environments (e.g., machines with different OSs, desktops, virtual machines (VMs), etc.). Containerization eliminates the problem of transferring an application between different computing environments by bundling the application code together with the related configuration files, libraries, and dependencies required for it to run. This single package of software (i.e., the container) is abstracted away from the host operating system, and hence, it stands alone and becomes portable—able to run across any platform or cloud, free of issues.

DETAILED DESCRIPTION

Embodiments herein describe a deployment technique where the same binary (e.g., the same binary image) defining a plurality of microservices is used in different, customized deployments. Containers are often preferred when executing microservices in different deployment environments. Generally, a microservice is a piece or portion of a software application. For example, a software application for operating a point of sale (POS) terminal can be divided into a plurality of microservices such as pricing, catalog lookup, order persistency, cash tracking, and the like. When deploying new POS terminals, the customer may want to use some of the microservices offered by the vendor, but not others. A deployment system has to cobble together a customized deployment for the customer which has separate containers for the specific microservices requested by the customer. Alternatively, the deployment system can gather the microservices together into a single package or runtime which the customer can execute. In any case, for each customer, the deployment system has to build, test, and support a customized deployment with the specific microservices desired by the customer.

As mentioned above, the system receives a different subset from the plurality of microservices transmitted from a vendor deployment system. For example, the system receives Microservices A, B, and E based on one customer profile, and receives Microservices A, C, and D based on another customer profile. Currently, the vendor deployment system must generate separate containers for the microservices or construct a custom package containing the microservices designated in the customer profile. This process requires significant pipeline processing and memory usage. Further, doing so requires excess time to build, test, and support the custom deployments.

In at least one embodiment herein, the vendor deployment system can send to each customer the same binary that defines all the microservices offered by the vendor. That is, the vendor deployment system can build one binary image of its platform (which has all the microservices) that is deployed to every customer. The vendor deployment system also provides a deployment descriptor that is used during runtime to activate the microservices desired by the customer. Continuing the example above, the deployment descriptor for Customer A contains flags indicating the Microservices A, B, and E are active while the remaining microservices defined in the binary are inactive. Conversely, the deployment descriptor for Customer A contains flags indicating that the Microservices A, C, and D should be active. In this manner, the vendor deployment system can generate a customized deployment without having to build a new binary by simply manipulating the data or flags in the deployment descriptor.

Advantages of a Deployment Descriptor

The embodiments herein avoid having to build a custom package or separate containers for each customer deployment. This increases the speed at which the deployment can be initiated as well as improves performance of the deployment of containers containing custom packages by reducing the chance of errors and improving the operation and functionality of the POS terminals. Moreover, this deployment process is compatible with current containerization techniques. Further, the embodiments herein reduce the resources associated with supporting and maintaining each customized deployment.

Figure 1:
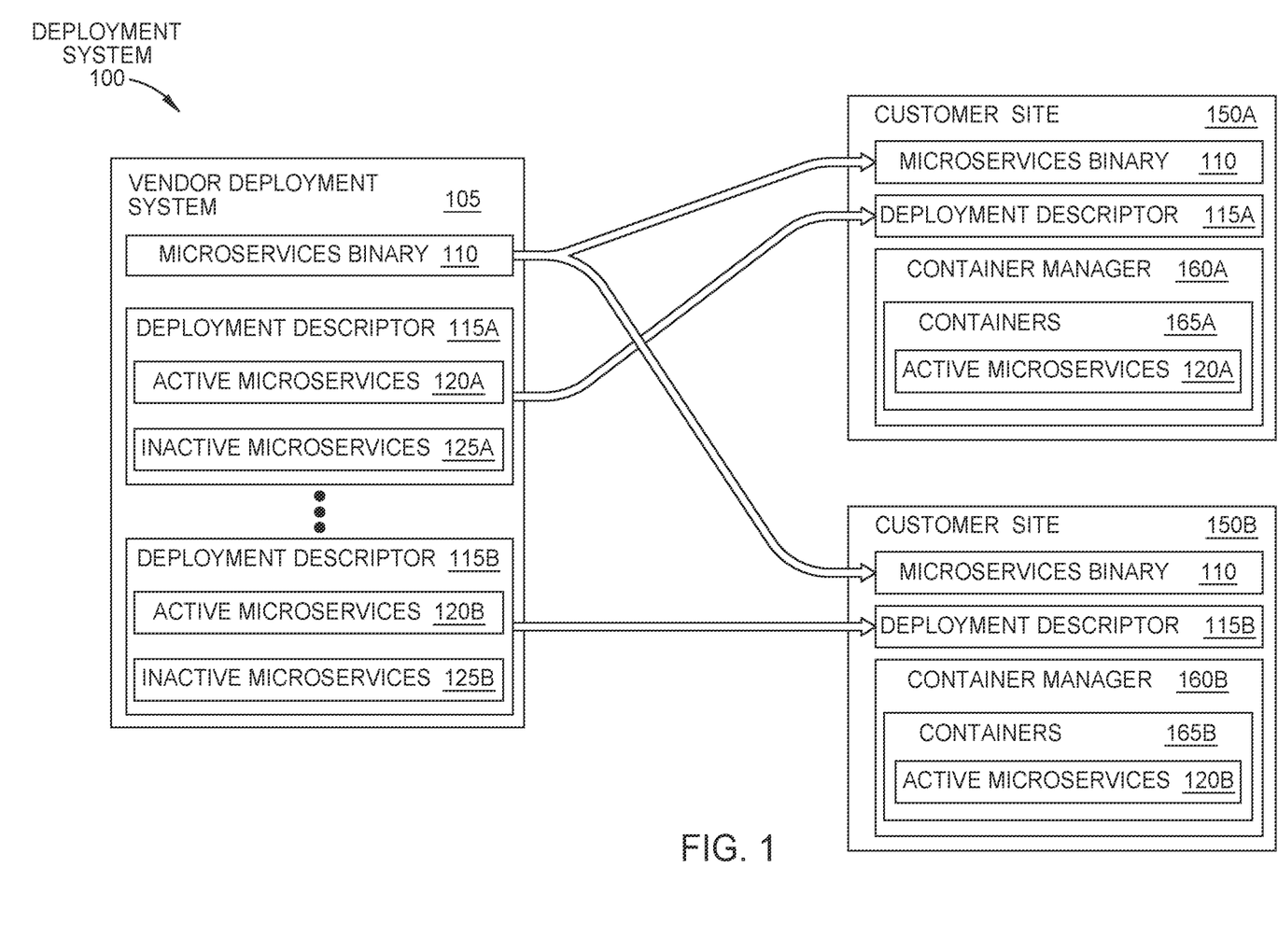
FIG. 1 illustrates deploying the same microservices binary to different customers, according to one embodiment.

FIG. 1 illustrates deploying the same microservices binary 110 to different customers, according to one embodiment. In one embodiment, the microservices binary 110 contains compiled code corresponding to a plurality of microservices. For example, the microservice binary 110 can be the binary for a software platform or application that has multiple microservices that can operate independently of each other. In the embodiments below, the microservice binary 110 is often described in the context of a platform for operating POS terminals but is not limited to such. The microservice binary 110 can be used to define a platform for operating other devices or services besides a POS terminal.

In FIG. 1, the microservices binary 110 is generated or built by a vendor deployment system 105 which is transmitted to customer sites 150. Rather than providing a customized binary to each customer containing the compiled code for the microservices desired by the customers, the deployment system 100 transmits the binary 110 which has the code for all of the microservices offered by the vendor deployment system 105. That is, each customer site 150 receives the same microservices binary 110 despite having different, customized deployments.

The vendor deployment system 105 also provides deployment descriptors 115 which, unlike the binary 110, are customized for each customer site 150. In this example, the customer site 150A receives the deployment descriptor 115A while the customer site 150B receives the deployment descriptor 115B. As shown, the deployment descriptor 115A specifies active microservices 120A and inactive microservices 125A. In general, the active microservices 120A are the microservices that the customer site 150A will execute or run at a particular location or on a particular computing system while the inactive microservices 125B are the microservices the customer site 150A does not execute at that location or computing system. Because the customer sites 150A and 150B can have different deployment configurations or different levels of complexity, the activate microservices 120A and inactive microservices 1250A specified in the deployment descriptor 115A may be different from the active microservices 120B and inactive microservices 1250A specified in the deployment descriptor 115B.

The embodiments herein are not limited to a particular implementation of the deployment descriptor 115, which may vary depending on the type of container engine deployed by the customer site 150 (e.g., DOCKER® Engine or KUBERNETES®). Regardless of the implementation, the deployment descriptor 115 (e.g., a file) includes some type of indicator such as a flag indicating the active microservices 120. The deployment descriptor 115 can also have flags indicating the inactive microservices 125, or the microservices might be inactive by simply excluding them from the deployment descriptors 115.

As shown, the customer sites 150A and 150B both receive the same microservices binary 110, but different deployment descriptors 115. Both customer sites 150A and 150B include a container manager 160 that defines and executes one or more container applications. That is, the container manager 160 can manage containers 165 that execute one or more active microservices. In this example, the customer site 150A operates the containers 165A which execute the active microservices 120A while the customer site 150B operates the containers 165B which execute the microservices 120B. When starting up the application, the container manager 160 can reference their respective deployment descriptors 115 to determine which of the microservices in the binary 110 to activate. In one embodiment, the deployment descriptors 115 provide startup arguments to the container managers 160 that are used as command line arguments when starting up or executing the microservices binary 110. In one example, the command line arguments indicate to a runtime tool (e.g., DOCKER® Compose) which of the microservices should be activated. In this manner, each customer site 150 can have a customized deployment while receiving the same binary or binary image.

In one embodiment, each active microservice 120 (e.g., microservices 120A and 120B) in FIG. 1 is executed by a separate container 165 (e.g., containers 165A and 165B). In another embodiment, multiple active microservices 120 can be executed by the same container 165. Further, the embodiments herein can be used in a collapsed deployment where the active microservices 120 are executed at the same location or computing system, or a distributed deployment where active microservices 120 are executed at different customer locations or multiple computing systems. In other examples, different deployments are discussed later in FIGS. 3 and 4.

Figure 2:
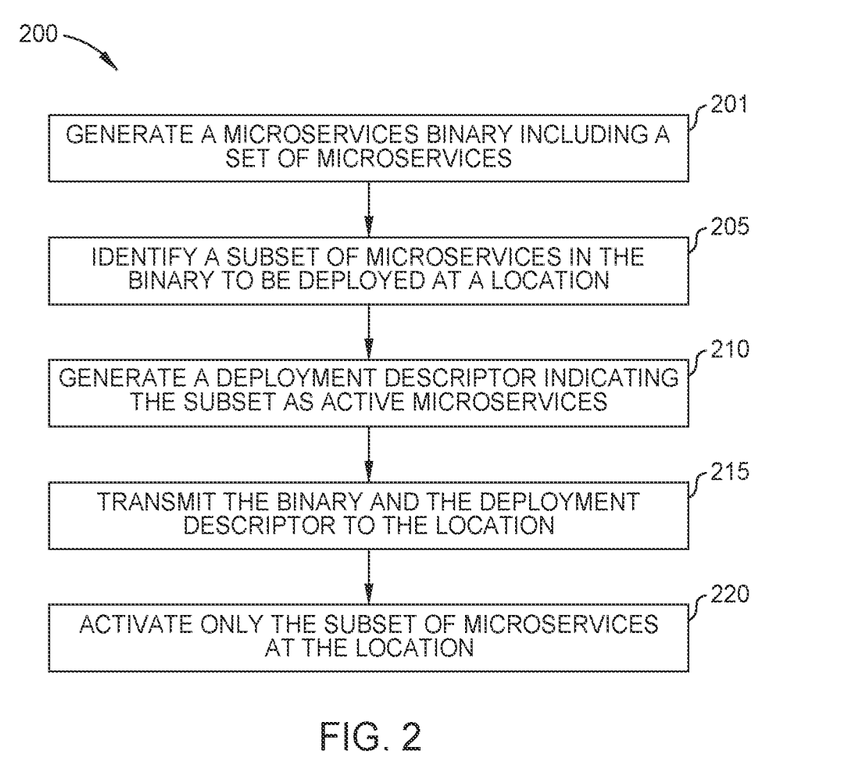
FIG. 2 is a flowchart for generating a customized deployment descriptor for a deployment, according to one embodiment.

FIG. 2 is a flowchart of a method 200 for generating a customized deployment descriptor for a deployment, according to one embodiment. In one example, at block 201, the vendor deployment system (e.g., a computing system) generates a microservices binary (e.g., the microservices binary 110) including compiled code for a set of microservices. The set of microservices can include all the microservices offered by a vendor's platform (e.g., a platform for operating a particular product sold by the vendor, such as a POS terminal).

At block 205, the vendor deployment system identifies a subset of microservices in the microservices binary to be deployed at a location. For example, a customer computing device may transmit the vendor deployment system with a list of the microservices it wants to use at a particular site, which is a subset of the total number of microservices offered by the vendor deployment system in the microservices binary. As an example, the customer may want to use the pricing and catalog lookup microservices offered by the vendor deployment system, but not the order persistency and cash tracking microservices. Instead, the customer may have its own custom microservices for the services.

In one example, the customer deployment uses a subset of the microservices offered by the vendor's platform. Nonetheless, the vendor deployment system can still use the binary containing the compiled code for all the microservices to initiate the customer deployment. In another example, the process disclosed at method 200 enables the vendor deployment system to avoid generating a customized binary (or build) for each different customer deployment, or generating separate containers for each microservice desired by the customer, which increases the speed at which the deployment can be initiated as well as improves performance of the deployment of containers containing custom packages by reducing the chance of errors At block 210, the vendor deployment system uses a computing system to generate a deployment descriptor indicating the subset of microservices selected by the customer as active microservices. In one embodiment, the deployment descriptor (e.g., a file) includes flags or other type of selection elements indicating the active microservices. The deployment descriptor can also have flags indicating the inactive microservices (i.e., the microservices in the platform that were not selected by the customer). In this manner, the deployment descriptor indicates which of the microservices in the binary should be active and which are inactive when the binary is executed at the customer's location or computing system.

The vendor deployment system can use any software application to generate the deployment descriptor. For example, the vendor deployment system may use a software application compatible with a containerization platform such as DOCKER® or KUBERNETES® to generate the deployment descriptor.

At block 215, the vendor deployment system uses a computing system to transmit the binary and the deployment descriptor to the customer's location. In one embodiment, the customer has one location (e.g., a central location) in which the microservices are deployed (e.g., a store controller, a cloud computing service, or data center). In another embodiment, the microservices are deployed to multiple customer sites. For example, the microservices may be deployed at store controllers at each of the customer's stores or sties, or at multiple stores along with an enterprise-level data center. Moreover, the deployments at the different locations may be the same (e.g., the same microservices are deployed) or some of the locations may use a different set of the microservices. For example, the store controllers may use the same deployment of microservices while the enterprise data center uses a different deployment of microservices. In that case, the vendor deployment system can generate different deployment descriptors for the different customer deployments. Nonetheless, creating multiple deployment descriptors for a customer is a relatively simple task when compared to generating multiple different builds with multiple different binaries as done previously.

At block 220, the customer activates the subset of microservices at the location. For example, the location can include a container manager (e.g., the container manager 160 in FIG. 1) that activates and maintains the subset of microservices. The container manager can reference the deployment descriptor to determine which of the microservices in the binary to activate. In one embodiment, the deployment descriptor provides startup arguments that the container manager can use as command line arguments when executing the binary. The command line arguments indicate to a runtime tool which of the microservices should be activated. In this manner, the container manager activates the microservices requested for the customer site while the other microservices defined in the binary are inactive (i.e., unused).

Figure 3:
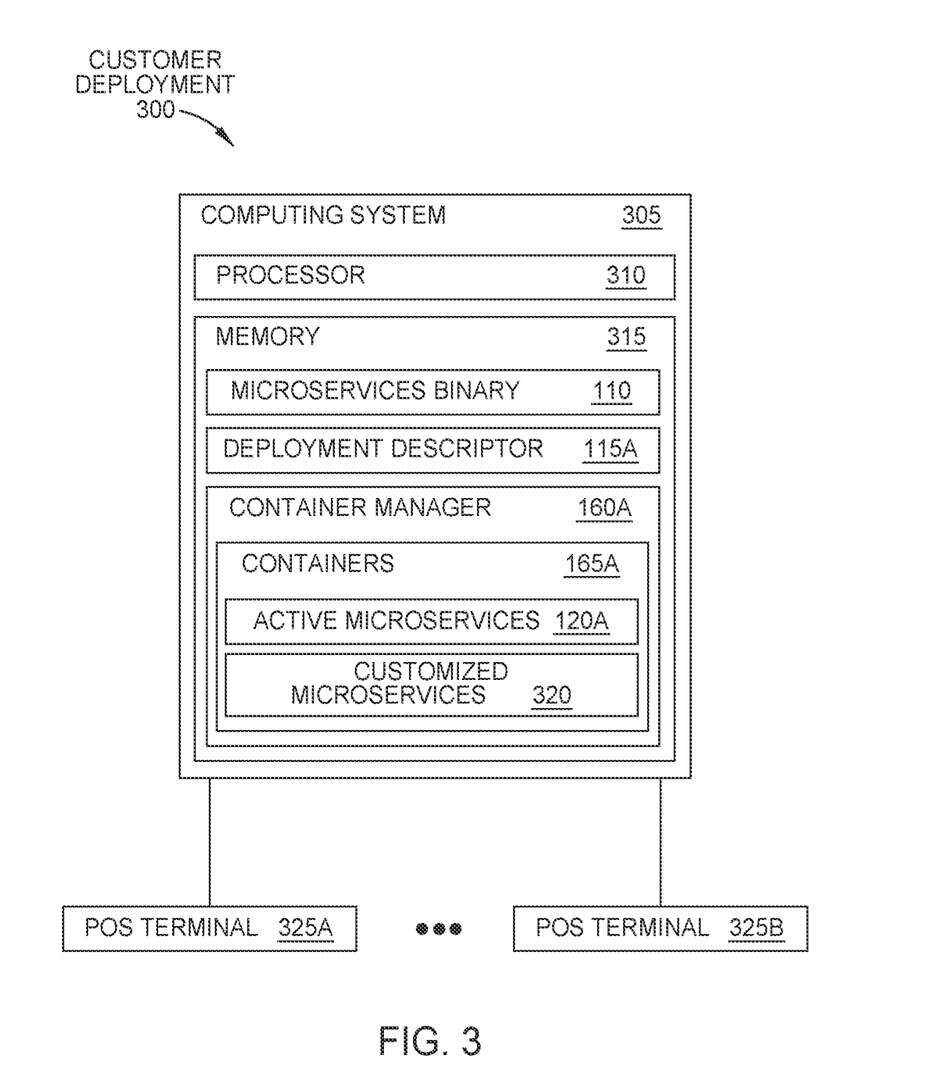
FIG. 3 illustrates a deployment with a mix of vendor microservices and customer microservices, according to one embodiment.

FIG. 3 illustrates a customer deployment 300 with a mix of vendor microservices and customer microservices, according to one embodiment. The customer deployment 300 is an example of a collapsed deployment where the customer uses a subset of the microservices offered by the vendor deployment system at a particular location.

The customer deployment 300 includes a computing system 305 coupled to POS terminals 325. In one embodiment, the computing system 305 and the POS terminals 325 are disposed at the same geographic location (e.g., the same stored), but in other embodiments, the computing system 305 may be at a different location than the POS terminals 325. In one example, the computing system 305 is a store controller.

The computing system 305 can include a single computing device (e.g., a server) or multiple interconnected computing devices (e.g., a data center). In this example, the computing system 305 includes a processor 310 that represents one or more processing elements that each may include one or more processing cores. The system 305 also include memory 315 which can include volatile memory, non-volatile memory, and combinations thereof. The memory 315 stores the microservices binary 110 (which was received from a vendor deployment system, such as the vendor of the POS terminals 325), the deployment descriptor 115A, and the container manager 160A. In this example, the microservices binary 110 includes a vendor platform for setting up and operating the POS terminals 325.

As discussed above, the container manager 160A can use the deployment descriptor 115A to selectively execute a subset of the microservices included in the microservices binary 110. This subset of microservices is illustrated by the active microservices 120A and can also be referred to as vendor microservices. In addition to executing vendor microservices in the containers 165A, the container manager 160A also has set up customized microservices 320. The microservices 320 may also be used in conjunction with the POS terminals 325 (e.g., may share information with the POS terminals 325). Instead of being developed by the vendor, the customized microservices 320 may have been created by the customer or by a different third party vendor.

In one embodiment, the customized microservices 320 perform a service that is the same or similar as one of the microservices in the microservices binary 110. In one example, the customer site uses the customized microservices 320 rather than the microservices provided by the vendor deployment system in the binary 110. The binary 110 may include a microservice to maintain order persistency when a shopper makes a purchase at the POS terminals 325. In another example, the customer site uses its own microservice to maintain order persistency because the microservice, e.g., integrates more efficiently with other services offered at the customer site or with legacy systems. Whatever the reason, the customer can decide to use their own customized microservices 320 rather than the vendor's microservices. In another example, by using the deployment descriptor 115A, the customer can implement the microservices it wants from the vendor without the vendor deployment system having to prepare a special binary or build for the customer, or having to set up each individual container and microservice.

Figure 4:
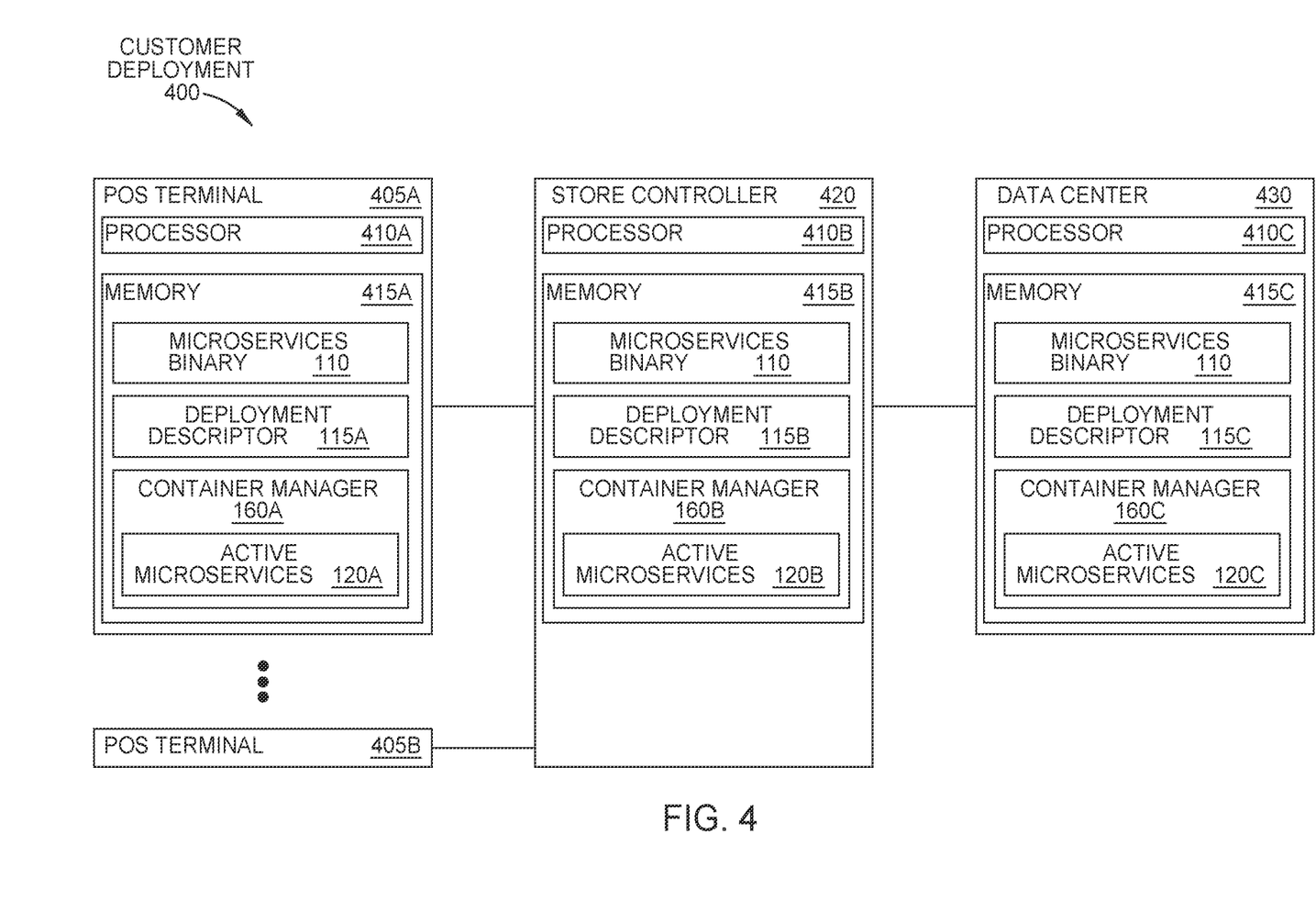
FIG. 4 illustrates a distributed deployment with different microservices at different locations, according to one embodiment.

FIG. 4 illustrates a customer deployment 400 with different microservices at different locations, according to one embodiment. The customer deployment 400 is an example of a distributed deployment where the customer uses a subset of the microservices offered by the vendor at different locations.

Here, the customer deployment 400 includes POS terminals 405, a store controller 420, and a data center 430 (e.g., an enterprise-level data center). The POS terminals 405 each includes a processor 410A and memory 415A. Further, the memory 415A includes the microservices binary 110 and a deployment descriptor 115A customized for the POS terminals 405. That is, in this example, the POS terminals 405 receive a different deployment descriptor 115A than the store controller 420 and the data center 430. Notably, even though the POS terminals 405, the store controller 420, and the data center 430 receive the same microservices binary 110, they receive different deployment descriptors 115 which change the subset of vendor microservices that are activated on the systems.

As shown, the container manager 160A on the POS terminals 405 has a first subset of activate microservices 120A. In one embodiment, each of the POS terminals 405 has the same set of active microservices 120A (e.g., the deployment on each of the POS terminals in the same). In another embodiment, the customer may want different microservices active on different POS terminals 405. In that case, the vendor deployment system can generate different deployment descriptors for the POS terminals 405 which would result in activating a different subset of vendor microservices in the POS terminal 405A than the POS terminal 405B.

The store controller 420 includes a processor 410B and memory 415B which stores the microservices binary 110, the deployment descriptor 115B, and the container manager 160B. As mentioned above, because the deployment descriptor 115B may list or flag a different subset of the microservices in the binary 110, the store controller may have a different set of active microservices 120B than the set of active microservices 120A in the POS terminals 405.

The data center 430 includes a processor 410C and memory 415C which stores the microservices binary 110, the deployment descriptor 115C, and the container manager 160C. In one embodiment, the data center 430 may be a cloud computing service used by the customer to store information or perform certain services.

The deployment descriptor 115C for the data center 430 may list or flag a different subset of the microservices in the binary 110 than the deployment descriptor 115b for the store controller 420 and the deployment descriptor 115A for the POS terminals 405. Put differently, the customer may want to execute a different set of active microservices 120 at different locations or on different computing systems. All together, the active microservices 120A, 120B, and 120C may include all the microservices within the microservices binary 110. That is, unlike in FIG. 3 where the customer used a subset of the microservices offered by the vendor deployment system, here the customer may want to use all of the vendor's microservices but control which location those services are active. In another example, the vendor's microservices are distributed across different locations and/or computing systems.

In one example, the customer may choose to use customized microservices (i.e., microservices that do not originate from the vendor of the POS terminals 405) like shown in FIG. 3. For example, the customer may distribute a portion of the vender microservices and choose to use one or more customized microservices at one of the locations. For instance, the data center 430 may include a mix of vendor microservices originating from the binary 110 as well as one or more customized microservices that did not originate from the binary 110.

The processors discussed above are any electronic circuitry, including, but not limited to one or a combination of microprocessors, microcontrollers, application specific integrated circuits (ASIC), application specific instruction set processor (ASIP), and/or state machines, that communicatively couples to memory and controls the operation of a computing system (e.g., the POS terminals, store controllers, data center, etc.). The processor may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware that operates software to control and process information. The processor executes software stored on the memory to perform any of the functions described herein. The processor controls the operation and administration of the computing system by processing information (e.g., information received from the POS terminals). The processor is not limited to a single processing device and may encompass multiple processing devices.

The memory discussed above may store, either permanently or temporarily, data, operational software, or other information for the processor. The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory, a disk, a CD, or a flash drive. In particular embodiments, the software may include an application executable by the processor to perform one or more of the functions described herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
    generating a microservices binary including a set of microservices for deployment in one or more containers;
    identifying a first subset of the set of microservices to be deployed at a first location;
    generating a first deployment descriptor indicating the first subset of microservices as active microservices, wherein the deployment descriptor is configured to provide command line arguments to a container manager at the first location to use in order to activate the first subset of microservices at the first location; and
    transmitting the microservices binary and the first deployment descriptor to the first location, wherein, when executed at the first location, the deployment descriptor causes the first subset of microservices from the microservices binary to be activated in at least one container at the first location.

2. The method of claim 1, further comprising:
    identifying a second subset of the set of microservices to be deployed at a second location, wherein the second subset is different from the first subset;
    generating a second deployment descriptor indicating the second subset of microservices as active microservices; and
    transmitting the microservices binary and the second deployment descriptor to the second location, wherein, when executed at the second location, the second deployment descriptor causes the second subset of microservices from the microservices binary to be activated in at least one container at the second location.

3. The method of claim 2, wherein the first and second locations are part of the same customer deployment, wherein the same microservices binary is transmitted to both the first and second locations.

4. The method of claim 2, wherein the first location is part of a first deployment for a first customer and the second location is part of a second deployment for a second, different customer, wherein the same microservices binary is transmitted to both the first and second locations.

5. The method of claim 1, wherein the deployment descriptor indicates that the remaining microservices of the set of microservices should not be activated at the first location.

6. The method of claim 1, wherein the microservices binary is generated by a vendor who sells a device operated by the set of microservices in the microservice binary.

7. The method of claim 6, wherein the device is a point of sale (POS) terminal.

8. A system comprising:
    a processor; and memory storing an application which, when executed by the processor, performs an operation, the operation comprising:

generating a microservices binary including a set of microservices for deployment in one or more containers;

identifying a first subset of the set of microservices to be deployed at a first location;

generating a first deployment descriptor indicating the first subset of microservices as active microservices, wherein the deployment descriptor is configured to provide command line arguments to a container manager at the first location to use in order to activate the first subset of microservices at the first location; and transmitting the microservices binary and the first deployment descriptor to the first location, wherein, when executed at the first location, the deployment descriptor causes the first subset of microservices from the microservices binary to be activated in at least one container at the first location.

9. The system of claim 8, wherein the operation further comprises:

identifying a second subset of the set of microservices to be deployed at a second location, wherein the second subset is different from the first subset;

generating a second deployment descriptor indicating the second subset of microservices as active microservices; and transmitting the microservices binary and the second deployment descriptor to the second location, wherein, when executed at the second location, the second deployment descriptor causes the second subset of microservices from the microservices binary to be activated in at least one container at the second location.

10. The system of claim 9, wherein the first and second locations are part of the same customer deployment, wherein the same microservices binary is transmitted to both the first and second locations.

11. The system of claim 9, wherein the first location is part of a first deployment for a first customer and the second location is part of a second deployment for a second, different customer, wherein the same microservices binary is transmitted to both the first and second locations.

12. The system of claim 8, wherein the deployment descriptor indicates that the remaining microservices of the set of microservices should not be activated at the first location.

13. The system of claim 10, wherein the microservices binary is generated by a vendor who sells a device operated by the set of microservices in the microservice binary.

14. A computer-readable storage medium having computer-readable program code embodied therewith, the computer-readable program code executable by one or more computer processors to perform an operation, the operation comprising:

generating a microservices binary including a set of microservices for deployment in one or more containers;

identifying a first subset of the set of microservices to be deployed at a first location;

generating a first deployment descriptor indicating the first subset of microservices as active microservices, wherein the deployment descriptor is configured to provide command line arguments to a container manager at the first location to use in order to activate the first subset of microservices at the first location; and transmitting the microservices binary and the first deployment descriptor to the first location, wherein, when executed at the first location, the deployment descriptor causes the first subset of microservices from the microservices binary to be activated in at least one container at the first location.

15. The computer-readable storage medium of claim 14, wherein the operation further comprises:

identifying a second subset of the set of microservices to be deployed at a second location, wherein the second subset is different from the first subset;

generating a second deployment descriptor indicating the second subset of microservices as active microservices; and transmitting the microservices binary and the second deployment descriptor to the second location, wherein, when executed at the second location, the second deployment descriptor causes the second subset of microservices from the microservices binary to be activated in at least one container at the second location.

16. The computer-readable storage medium of claim 15, wherein the first and second locations are part of the same customer deployment, wherein the same microservices binary is transmitted to both the first and second locations.

17. The computer-readable storage medium of claim 15, wherein the first location is part of a first deployment for a first customer and the second location is part of a second deployment for a second, different customer, wherein the same microservices binary is transmitted to both the first and second locations.

18. The computer-readable storage medium of claim 14, wherein the deployment descriptor indicates that the remaining microservices of the set of microservices should not be activated at the first location.

* * * * *

UNITED STATES PATENT AND TRADEMARK OFFICE
CERTIFICATE OF CORRECTION

| | |
|---|---|
| PATENT NO. | : 11,995,425 B2 |
| APPLICATION NO. | : 17/511789 |
| DATED | : May 28, 2024 |
| INVENTOR(S) | : Jonathan M. Waite et al. |

Page 1 of 1

It is certified that error appears in the above-identified patent and that said Letters Patent is hereby corrected as shown below:

In the Specification

In Column 3, Line 3, delete "1250A" and insert -- 125A --.

In Column 3, Line 6, delete "1250A" and insert -- 125B --.

In Column 4, Line 19, delete "errors" and insert -- errors. --.

Signed and Sealed this
First Day of October, 2024

Katherine Kelly Vidal
*Director of the United States Patent and Trademark Office*